United States Patent
Su et al.

(10) Patent No.: US 7,644,062 B2
(45) Date of Patent: Jan. 5, 2010

(54) JOIN FACTORIZATION OF UNION/UNION ALL QUERIES

(75) Inventors: Hong Su, Foster City, CA (US); Rafi Ahmed, Fremont, CA (US); Allison Lee, Sunnyvale, CA (US); Mohamed Zait, San Jose, CA (US); Thierry Cruanes, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 314 days.

(21) Appl. No.: 11/716,010

(22) Filed: Mar. 8, 2007

(65) Prior Publication Data

US 2007/0219969 A1    Sep. 20, 2007

Related U.S. Application Data

(60) Provisional application No. 60/782,785, filed on Mar. 15, 2006.

(51) Int. Cl.
   G06F 7/00      (2006.01)
   G06F 17/30     (2006.01)
(52) U.S. Cl. .................................... 707/2; 707/3; 707/4
(58) Field of Classification Search .................. 707/1–4, 707/100, 101, 102
   See application file for complete search history.

(56) References Cited

U.S. PATENT DOCUMENTS

| 4,769,772 A | 9/1988 | Dwyer |
| 4,829,427 A | 5/1989 | Green |
| 5,091,852 A | 2/1992 | Tsuchida et al. |
| 5,325,525 A | 6/1994 | Shan et al. |
| 5,339,429 A | 8/1994 | Tanaka et al. |
| 5,412,804 A | 5/1995 | Krishna |
| 5,437,032 A | 7/1995 | Wolf et al. |

(Continued)

OTHER PUBLICATIONS

Deutsch, Alin et al., "Minimization and Group-By Detection for Nested XQueries", University of California, San Diego, 2003, 15 pages.

(Continued)

*Primary Examiner*—Don Wong
*Assistant Examiner*—Merilyn P Nguyen
(74) *Attorney, Agent, or Firm*—Hickman Palermo Truong & Becker, LLP

(57) ABSTRACT

Under a type of query transformation referred to herein as join factorization, the branches of an UNION/UNION ALL query that join a common table are combined to reduce accesses to the common table. The transformation can be expressed as (T1 join T2) union all (T1 join T3)=T1 join (T2 union all T3), where T1, T2 and T3 are three tables. A given query may be rewritten in many alternate ways using join factorization. Evaluating each alternative can be expensive. Therefore, the alternatives are generated and evaluated in a way that minimizes the cost of evaluating the alternatives.

20 Claims, 5 Drawing Sheets

U.S. PATENT DOCUMENTS

| | | | |
|---|---|---|---|
| 5,452,468 | A | 9/1995 | Peterson |
| 5,495,419 | A | 2/1996 | Rostoker et al. |
| 5,495,606 | A | 2/1996 | Borden et al. |
| 5,537,588 | A | 7/1996 | Engelmann et al. |
| 5,548,755 | A | 8/1996 | Leung et al. |
| 5,551,027 | A | 8/1996 | Choy et al. |
| 5,574,900 | A | 11/1996 | Huang et al. |
| 5,590,319 | A | 12/1996 | Cohen et al. |
| 5,642,515 | A | 6/1997 | Jones et al. |
| 5,675,791 | A | 10/1997 | Bhide et al. |
| 5,680,547 | A | 10/1997 | Chang |
| 5,710,915 | A | 1/1998 | McElhiney |
| 5,787,251 | A | 7/1998 | Hamilton et al. |
| 5,797,136 | A | 8/1998 | Boyer et al. |
| 5,822,748 | A | 10/1998 | Cohen et al. |
| 5,832,477 | A | 11/1998 | Bhargava et al. |
| 5,857,180 | A | 1/1999 | Hallmark et al. |
| 5,918,225 | A | 6/1999 | White et al. |
| 5,960,427 | A | 9/1999 | Goel et al. |
| 5,963,932 | A | 10/1999 | Jakobsson et al. |
| 6,009,265 | A | 12/1999 | Huang et al. |
| 6,021,405 | A | 2/2000 | Celis et al. |
| 6,026,394 | A | 2/2000 | Tsuchida et al. |
| 6,044,378 | A | 3/2000 | Gladney |
| 6,061,676 | A | 5/2000 | Srivastava et al. |
| 6,289,334 | B1 | 9/2001 | Reiner et al. |
| 6,298,342 | B1 | 10/2001 | Graefe et al. |
| 6,339,768 | B1 | 1/2002 | Leung et al. |
| 6,370,524 | B1 | 4/2002 | Witkowski |
| 6,430,550 | B1 | 8/2002 | Leo et al. |
| 6,438,558 | B1 | 8/2002 | Stegelmann |
| 6,438,562 | B1 | 8/2002 | Gupta et al. |
| 6,529,896 | B1 | 3/2003 | Leung et al. |
| 6,529,901 | B1 | 3/2003 | Chaudhuri et al. |
| 6,535,874 | B2 | 3/2003 | Purcell |
| 6,684,203 | B1 | 1/2004 | Waddington et al. |
| 6,694,306 | B1 | 2/2004 | Nishizawa et al. |
| 6,708,179 | B1* | 3/2004 | Arora ................. 707/102 |
| 6,792,420 | B2 | 9/2004 | Chen et al. |
| 6,901,405 | B1 | 5/2005 | McCrady et al. |
| 6,934,699 | B1 | 8/2005 | Haas et al. |
| 6,941,360 | B1 | 9/2005 | Srivastava et al. |
| 6,947,927 | B2 | 9/2005 | Chaudhuri et al. |
| 6,954,776 | B1 | 10/2005 | Cruanes et al. |
| 6,961,729 | B1 | 11/2005 | Toohey et al. |
| 6,980,988 | B1 | 12/2005 | Demers et al. |
| 6,990,503 | B1 | 1/2006 | Luo et al. |
| 7,031,956 | B1 | 4/2006 | Lee et al. |
| 7,072,896 | B2 | 7/2006 | Lee et al. |
| 7,089,225 | B2 | 8/2006 | Li et al. |
| 7,107,255 | B2* | 9/2006 | Kiernan et al. ............. 707/2 |
| 7,167,852 | B1 | 1/2007 | Ahmed et al. |
| 7,188,098 | B2* | 3/2007 | Chen et al. ................. 707/2 |
| 7,246,108 | B2 | 7/2007 | Ahmed |
| 7,363,289 | B2 | 4/2008 | Chaudhuri et al. |
| 7,383,256 | B2* | 6/2008 | Larson et al. .............. 707/4 |
| 7,440,937 | B2 | 10/2008 | Kiernan et al. |
| 7,467,152 | B2* | 12/2008 | Kearsey et al. ............ 707/102 |
| 2001/0047372 | A1 | 11/2001 | Gorelik et al. |
| 2002/0038313 | A1 | 3/2002 | Klein et al. |
| 2002/0138376 | A1 | 9/2002 | Hinkle |
| 2003/0120825 | A1 | 6/2003 | Avvari et al. |
| 2004/0068509 | A1 | 4/2004 | Garden et al. |
| 2004/0068696 | A1 | 4/2004 | Seyrat et al. |
| 2004/0143791 | A1 | 7/2004 | Ito et al. |
| 2004/0148278 | A1 | 7/2004 | Milo et al. |
| 2004/0153435 | A1* | 8/2004 | Gudbjartsson et al. ......... 707/1 |
| 2004/0220911 | A1 | 11/2004 | Zuzarte et al. |
| 2004/0220923 | A1 | 11/2004 | Nica |
| 2004/0267760 | A1 | 12/2004 | Brundage et al. |
| 2004/0268305 | A1 | 12/2004 | Hogg et al. |
| 2005/0187917 | A1 | 8/2005 | Lawande et al. |
| 2005/0198013 | A1 | 9/2005 | Cunningham et al. |
| 2005/0234965 | A1 | 10/2005 | Rozenshtein et al. |
| 2005/0278289 | A1 | 12/2005 | Gauweiler et al. |
| 2005/0278616 | A1 | 12/2005 | Eller |
| 2005/0283471 | A1 | 12/2005 | Rafi |
| 2005/0289125 | A1 | 12/2005 | Liu et al. |
| 2006/0026115 | A1 | 2/2006 | Ahmed |
| 2006/0026133 | A1 | 2/2006 | Ahmed |
| 2006/0041537 | A1 | 2/2006 | Rafi |
| 2006/0168513 | A1 | 7/2006 | Coulson et al. |
| 2007/0043697 | A1* | 2/2007 | Driesch et al. ............. 707/2 |
| 2007/0044012 | A1 | 2/2007 | Suver et al. |
| 2007/0185833 | A1* | 8/2007 | Turkel et al. .............. 707/3 |
| 2008/0010240 | A1 | 1/2008 | Zait |
| 2008/0077606 | A1 | 3/2008 | Fang et al. |

OTHER PUBLICATIONS

Dehaan, David, "A Rewriting Algorithm for Multi-Block Aggregation Queries and Views using Prerequisites and Compensations", University of Waterloo, Canada, Technical Report CS-2004-25, May 3, 2004, 39 pages.

Chaudhuri, Surajit, "An Overview of Query Optimization in Relational Systems", Microsoft Research, 1998, 10 pages.

Muralikrishna, M., "Improved Unnesting Algorithms for Join Aggregate SQL Queries", VLDB Conference, Canada, 1992, 12 pages.

Hayu, John, "Analytic SQL Features in Oracle9i", An Oracle Technical White Paper, Dec. 2001, 32 pages.

Oracle, "Optimizer Modes, Plans Stability, and Hints", Oracle8i Tuning Release 8.1.5 A67775-01, Oracle Website, 1999, 54 pages.

Bergsten, et al., "Prototyping DBS3 A Shared-Memory Parallel Database System", IEEE 818622954, 226-234, 1991, pp. 226-234.

Bhide, Anupam, "An Analysis of Three Transaction Processing Architectures", Computer Science Division, UC Berkeley, Proceeding of the 14th VLDB Conference, 1998, pp. 339-350.

Copeland, George et al., "Data Placement in Bubba," ACM 0897912683, 1988, pp. 99-108.

Dayal, Umeshwar, "Of Nests and Trees: A Unified Approach to Processing Queries That Contain Nested Subqueries, Aggregates and Quantifiers", Proceedings of the 13TH VLDB Conference, Brighton 1987, pp. 197-208.

Dewitt, et al., "A Performance Analysis of the Gamma Database Machine," Computer Sciences Department, University of Wisconsin, 1988, pp. 350-360.

Englert, Susan et al., "A Benchmark of Nonstop SQL Release 2 Demonstrating Near-Linear Speedup and Scaleup on Large Databases", Technical Report 89.4, Tandem Part No. 27469, May 1989, pp. 1-23.

Graefe, Goetz, "Encapsulation of Parallelism in the Volcano Query Processing System," March 1990, pp. 102-111.

Hirano, et al., "Load Balancing Algorithm for Parallel Processing on Shared Memory Multiprocessor", IEEE, pp. 210-217, 1991.

Hong, et al., "Optimization of Parallel Query Execution Plans in XPRS ", Proceedings of the First International Conference on Parallel and Distributed Information Systems, IEEE, 1991, pp. 218-225.

Leverenz et al., "Oracle 8i Concepts Release 8.1.5-A67781-01", Oracle Corporation, Feb. 1999, located on the internet at <http://www.csee.umbc.edu/help/oracle8/server.815/a67781/toc.htm>, 122 pages.

Lumpkin, George et al., "Query Optimization in Oracle 9i", Oracle Corporation, Oracle White Paper, Feb. 2002, pp. 1-30.

Pirahesh, Hamid, et al., "Extensible/Rule Base Query Rewrite Optimization in Starburst", IBM Almaden Research Center, 9 pages.

Selinger, P. Griffiths, et al., "Access Path Selection in a Relational Database Management System", Proceedings of the 1979 ACM SIGMOD International Conference on the Management of Data, 1979, pp. 23-34.

Stonebraker, Michael, et al. "The Design of XPRS," Proceedings of the 14TH VLDB Conference, 1988, pp. 318-330.

Tandem, "A Benchmark of NonStop SQL on the Debit Credit Transaction", The Tandem Performance Group, 1988, pp. 337-341.

Ahmed, Rafi, et al., "Cost-Based Query Transformation in Oracle," Copyright 2006 VLDB, ACM 1595933859, pp. 1026-1036.

Oracle, "Oracle 9I Database Documentation", Oracle, Parts A96670-01, A96674-01, A96673-02, 2002, 833 pages.

Fitzgerald et al., "Special Edition Using Crystal Reports IO", Que, Chapters 23, 24, 27, 35, Appendix A, Jul. 14, 2004, 170 pages.

Rankins et al., "Microsoft SQL Server 2000 Unleashed," Second Edition, Sams, Chapters 3, 4, 5, 6, 36, Dec. 18, 2002, 109 pages.

Erickson, Gail, "Improving Performance with SQL Server 2000 Indexed Views", Microsoft TechNet, Microsoft Corporation, Sep. 2000, 13 pages.

Rosenthal, Arnon, et al., "Outerjoin Simplification and Reordering for Query Optimization", ACM 1997, 31 pages.

Seshadri, Praveen, et al., "Cost-Based Optimization for Magic: Algebra and Implementation", SIGMOD Jun. 1996, ACM 1996, 11 pages.

Muralikrishna, M., "Improving Unnesting Algorithem for Join Aggregate SQL Queries", 18th VLDB Conference, Canada 1992, 12 pages.

Chaudhuri, Surajit, et al., "Including Group-By in Query Optimization", Hewlett-Packard Laboratories, 20th VLDB Conference Chile, 1994, 9 pages.

Mishra, Priti, et al., "Join Processing in Relational Databases", ACM Computing Surveys, Mar. 1992, 50 pages.

* cited by examiner

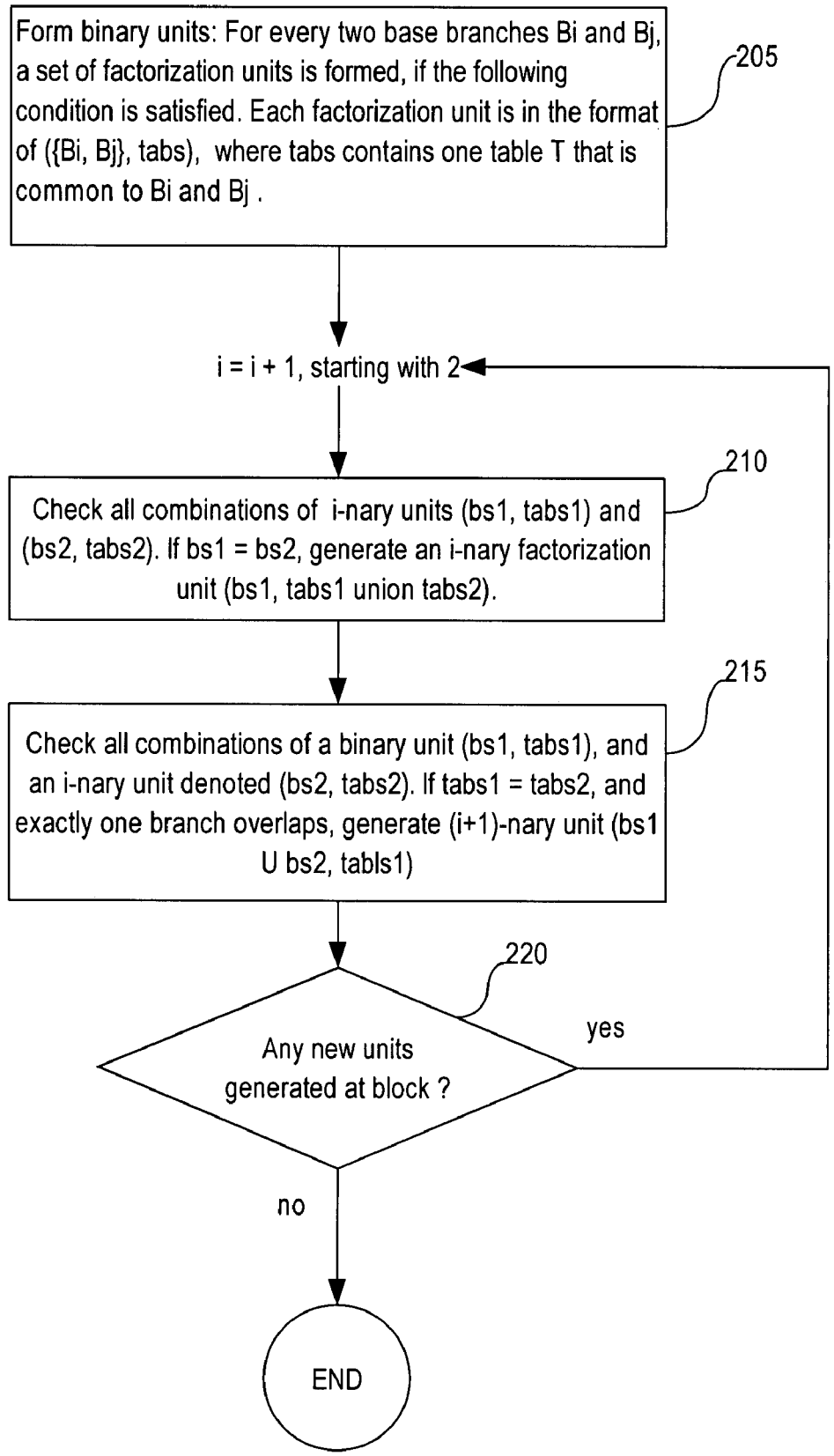

JOIN FACTORIZATION OF UNION/UNION ALL QUERIES

RELATED APPLICATIONS

The present application claims priority to U.S. Provisional Application No. 60/782,785 entitled Cost Based Query Transformation—Join Factorization And Group By Placement, filed on Mar. 15, 2006 by Hong Su, et al., the content of which is incorporated herein by reference.

The present application is related to U.S. Patent Application No. US 2007-0219951 A1, entitled Join Predicate Push-Down Optimizations, filed by Rafi Ahmed, Allison Lee and Dinesh Das, on the equal day herewith, the entire content of which is incorporated herein by reference.

The present application is related to U.S. Patent Application No. US 2007-0219977 A1, entitled Efficient Search Space Analysis for Join Factorization, filed by Hong Su, Rafi Ahmed, Allison Lee and Mohamed Zait, on the equal day herewith, the entire content of which is incorporated herein by reference.

FIELD OF THE INVENTION

The present invention relates to database systems, and in particular, to optimization of queries executed by a database system.

BACKGROUND

Relational and object-relational database management systems store information in tables of rows in a database. To retrieve data, queries that request data are submitted to a database server, which computes the queries and returns the data requested.

Query statements submitted to the database server should conform to the syntactical rules of a particular query language. One popular query language, known as the Structured Query Language (SQL), provides users a variety of ways to specify information to be retrieved.

A query submitted to a database server is evaluated by a query optimizer. Based on the evaluation, the query optimizer generates an execution plan that defines operations for executing the query. Typically, the query optimizer generates an execution plan optimized for efficient execution.

When a query optimizer evaluates a query, it determines various "candidate execution plans" and selects an optimal execution plan. The query may be transformed into one or more semantically equivalent queries. For the query and the one or more of transformed queries, various candidate execution plans are generated.

In general, a query optimizer generates optimized execution plans when the query optimizer is able to perform more kinds and combinations of transformations under more kinds of conditions. Based on the foregoing, there is clearly a need for more ways of transforming queries.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flow chart depicting a procedure for generating join factorization units according to an embodiment of the present invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

UNION/UNION ALL queries are frequently used in database applications, especially those that perform schema integration. For example, a retailer may have a lot of vendors. To find out detailed information of the products sold by the retailer, the product list of the retailer is joined with each vendor separately. The result of each join is then unioned and returned as the final result.

Execution plans generated for each of the joins can be evaluated separately. However, each separate evaluation accesses a common table (e.g., the retailer table containing the product list); thus the same table is wastefully accessed multiple times, leading to poorly performing execution plans. The performance of such execution plans can be even worse, if different joins share the same common join sub-expressions. These common join sub-expressions are evaluated many times, which can be quite expensive.

Under a type of query transformation referred to herein as join factorization, the branches of an UNION/UNION ALL query that join a common table are combined to reduce accesses to the common table. The transformation can be expressed as (T1 join T2) union all (T1 join T3)=T1 join (T2 union all T3), where T1, T2 and T3 are three tables.

A given query may be rewritten in many alternate ways using join factorization. Evaluating each alternative can be expensive. Therefore, the alternatives are generated and evaluated in a way that minimizes the cost of evaluating the alternatives.

Illustrative Operational Environment

Figure 1:
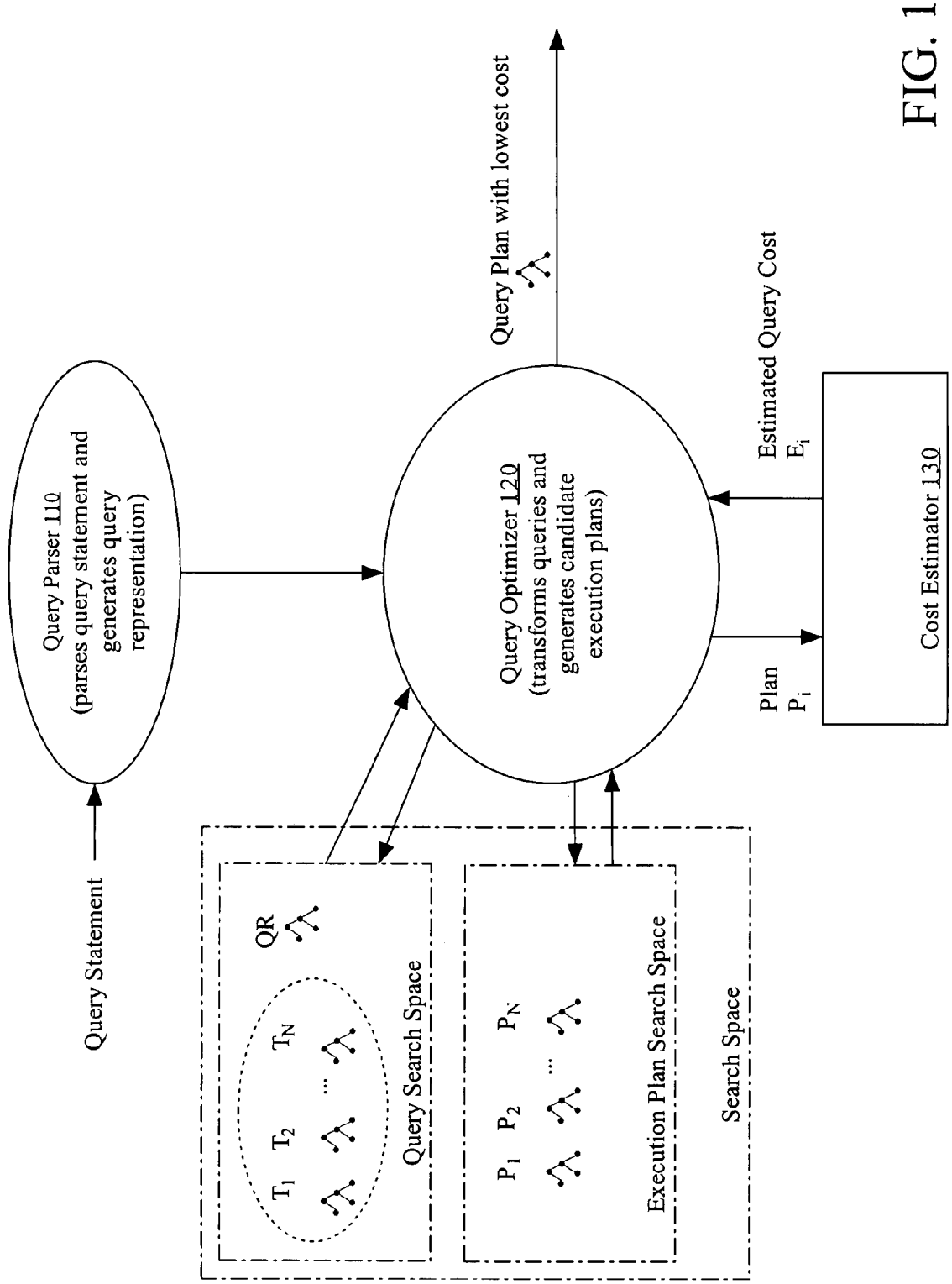
FIG. 1 is a diagram of a query optimizer according to an embodiment of the present invention.

FIG. 1 is a diagram depicting a query optimizer and related components within a database server (not shown). Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command may be in the form of a database statement. For the database server to process the database statements, the database statements must conform to a database language supported by the database server. One non-limiting database language supported by many database servers is SQL, including proprietary forms of SQL supported by such database servers as Oracle, (e.g. Oracle Database 10g). SQL data definition language ("DDL") instructions are issued to a database server to create or configure database objects, such as tables, views, or complex types.

Generally, data is stored in a database in one or more data containers, each container contains records, and the data within each record is organized into one or more fields. In relational database systems, the data containers are typically referred to as tables, the records are referred to as rows, and the fields are referred to as columns. In object oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Query Optimizer and Execution Plans

Referring to FIG. 1, query parser 110 receives a query statement QS and generates an internal query representation QR of the query statement. Typically, the internal query representation is a set of interlinked data structures that represent various components and structures of a query statement. The internal query representation may be in the form of a graph of nodes, each interlinked data structure corresponding to a node and to a component of the represented query statement. The internal representation is typically generated in memory for evaluation, manipulation, and transformation by query optimizer 120.

The term query is used herein to refer to any form of representing a query, including a query in the form of a database statement or in the form of an internal query representation. Query optimizer 120 may receive a query from another entity other than query parser 110, where the query received is in the form of an internal query representation.

Query optimizer 120 generates one or more different candidate execution plans for a query, which are evaluated by query optimizer 120 to determine which should be used to compute the query. For query QS, query optimizer 120 generates candidate execution plans $P_1$, $P_2$ through $P_N$.

Execution plans may be represented by a graph of interlinked nodes, referred to herein as operators, that each corresponds to a step of an execution plan, referred to herein as an execution plan operation. The hierarchy of the graphs (i.e., directed tree) represents the order in which the execution plan operations are performed and how data flows between each of the execution plan operations. Execution plan operations include, for example, a table scan, an index scan, hash-join, sort-merge join, nested-loop join, and filter.

Query optimizer 120 may optimize a query by transforming the query. In general, transforming a query involves rewriting a query into another query that produces the same result and that can potentially be executed more efficiently, i.e. one for which a potentially more efficient and less costly execution plan can be generated. Examples of query transformation include view merging, subquery unnesting, filter predicate move-around and pushdown, common subexpression elimination, outer-to-inner join conversion, materialized view rewrite, star transformation, and, join predicate push down. A query is rewritten by manipulating a deep copy of the query representation to form a transformed query representation representing a transformed query. The query as transformed is referred to herein as the transformed query; the query whose copy is transformed is referred to as the base query.

Query optimizer 120 may perform more than one transformation for evaluation. Each transformed query generated for a query is referred to as a candidate transformed query or candidate query. For query QS, query optimizer 120 generates candidate transformed queries $T_1$, $T_2$ ... $T_N$. A transformed query rewritten to generate another transformed query is referred to herein as a base query for the other transformed query. The query originally received by the query optimizer 120 is referred to as the original query.

The original query an optimizer optimizes (e.g. query QS) and the alternate transformed queries generated for the query are referred to individually as a candidate query and collectively as the query search space The one or more candidate execution plans generated for each query in the query search space are collectively referred to as the plan search space. The query search space generated by query optimizer 120 for query statement QS includes transformations $T_1$, $T_2$ ... $T_N$ and query QS; the plan search space comprises $P_1$, $P_2$ ... $P_N$.

Cost Estimation

To evaluate the candidate execution plans in the search space, query optimizer 120 estimates a cost of each candidate execution plan and compares the estimated query costs to select an execution plan for execution. In an embodiment, the estimated query cost is generated by a query cost estimator 130, which may be a component of query optimizer 120. For a plan $P_i$ supplied by query optimizer 120, cost estimator 130 computes and generates an estimated query cost $E_i$. In general, the estimated query cost represents an estimate of computer resources expended to execute an execution plan. The estimated cost may be represented as the execution time required to execute an execution plan. To determine which candidate execution plan in the search space to execute, query optimizer 120 may select the candidate execution plan with the lowest estimated cost.

Join Factorization

Join factorization is illustrated in context of illustrative rewrites. The following query QU is used to illustrate an example of join factorization.

```
QU=   SELECT T1.x, T2.z
      FROM T1, T2
      WHERE T1.x = T2.y
      UNION ALL
      SELECT T1.x, T3.v,
      FROM T1, T3
      WHERE T1.x = T3.u;
```

Query QU contains two query blocks as operands of a UNION ALL operator. Both query blocks join a common table T1. A query block that is an operand of UNION/UNION ALL operator is referred to herein as a branch; branches are referred to herein as being in or as forming a union. Because the branch is in a base query undergoing join factorization, the branch is referred to herein as a base branch. In the first base branch in QU, T1 is joined with T2, and in the second base branch, T1 is joined with T2. In a join factorization, a query with two or more base branches sharing a common join table is rewritten so that the common table is joined with an new inline view, where the inline view is UNION/UNION ALL query block that includes, for each base branch, a corresponding branch that joins and/or accesses the remaining tables of the base branch. Accordingly, QU is rewritten to QU' as follows.

```
QU'=  SELECT T1.x, V.z
      FROM T1,    (SELECT T2.y AS Y, T2.z AS Z
                   FROM T2
                   UNION ALL
                   SELECT T3.u AS Y, T3.v AS Z
                   FROM T3) V
      WHERE T1.x = V.y;
```

In QU', the common table is T1, and it is being joined with inline view V. The inline view V includes a UNION ALL query block with two branches that each correspond to a base branch in query QU. The first branch is SELECT T2.$y$, T2.$z$ FROM T2, which references the remaining table T2 from the first branch in QU. The second branch is SELECT T3.$u$, T3.$v$ FROM T3, which references the remaining table T3 from the second branch in QU. Table T1 is referred to as being factorized because it is the table common to the base branches that correspond to those in the inline view to which T1 is now joined. The query block that joins a factorized table with the inline view is referred to as a group branch; referring to the fact the group branch in effect replaces a group of base branches; the base branches in the group are referred to herein as having been grouped by the group branch.

The rewrite of QU to QU' causes generation of an execution plan that accesses (e.g., full table scan T1 or index based scan of T1) table T1 once to compute the join with inline view V rather than twice for each of the joins of the original base branches.

Correlated Join Factorization

Note that the join column for T1 and the join condition operator is the same for both of the base branches that are grouped. Under such conditions, the common table may be joined to the inline view based on the join column of the factorized table and join condition. In other words, the join condition for T1 is outside the inline view rather than inside the inline view. In another form of join factorization, the join column of the factorized table and join condition operator may not be the same for the base branches that are being grouped together. In this case, instead of a join for the factorized table being placed outside the inline view, a join condition operator referencing the factorized table is placed inside each branch of the inline view, each branch having a join condition operator referencing the same column of the factorized table and having the same join condition operator as the respective base branch. The join condition and factorized table are referred to herein as being correlated because the join condition refers to a table outside its query block.

A join factorization that results in a factorized table that is the correlated is referred to herein as a correlated join factorization with respect to the factorized table. A join factorization that does not result in the same is referred to herein as an uncorrelated join factorization. Correlated join factorization imposes a partial join order (i.e., the inline view must come after the factorized table(s) in the join permutation) as well as a join method (i.e., nested-loops join); the execution of the transformed query becomes very similar to that of join predicate pushdown (see Join Predicate Push-Down Optimizations). The rewrite of QU to QU' is an example of an uncorrelated join factorization with respect to T1. The following queries QC and QC' are used to illustrate a correlated join factorization.

```
QC=   SELECT T2.x, T1.z
      FROM T1, T2
      WHERE T1.x = T2.y
      UNION ALL
      SELECT T1.d, T3.w
      FROM T1, T3
      WHERE T1.u = T3.v;
QC'=  SELECT V.*
      FROM T1,    (SELECT T2.x, T1.z
                   FROM T2
                   WHERE T1.x = T2.y
                   UNION ALL
                   SELECT T1.d, T3.w
                   FROM T3
                   WHERE T1.u = T3.v) V;
```

In the join factorization, table T1 is factorized. In QC, the join condition for T1 in the first base branch refers to a different column of T1 than does the second join condition for T1 in the second base branch i.e. join condition T1.$x$=T2.$y$ and T1.$u$=T3.$v$ refer to different columns of T1. Hence, correlated join factorization is performed. This results in correlated join conditions T1.$x$=T2.$y$ and T1.$u$=T3.$v$ in the branches of the inline view V. The join conditions refer to correlated table T1, which is in the outer query of the inline view V.

Search Space Analysis

The above illustrations of join factorization represent simple cases. However, join factorization may entail much more complicated transformations of much more complicated queries. For example, a base query may contain many base branches. A set of base branches may be grouped based on more than one common table. There may be more than one set of common tables that can be factorized. For a given query, there may be many alternative ways of transforming queries using join factorization.

Analyzing an alternate join factorization transformation may entail generating a transformed query and estimating its query cost. Performing this operation consumes computer resources; doing this for all or even a proportion of all the alternate plans for a base query may create a cost that is significant compared to the cost of executing the base query, if not more. Thus, to optimize the cost of query optimization, various approaches may be used to determine what transformations are considered and when. Approaches for generating a search space and performing a cost based analysis of the alternate join factorizations are described below and referred to herein as search space analysis.

Search space analysis is explained in the context of the following query QE.

```
QE=  SELECT T1.c1, T2.c3, T3.c5
     FROM T1, T2, T3
        WHERE T1.c1 = T2.c2 and T2.c3 = T3.c4      (B1)
     UNION ALL
     SELECT T1.c1, T2.c3, T4.c5
     FROM T1, T2, T4
        WHERE T1.c1 = T2.c2 and T2.c3 = T4.c4      (B2)
     UNION ALL
     SELECT T5.c1, T6.c3, T3.c5
     FROM T5, T6, T3
        WHERE T5.c1 = T6.c2 and T6.c3 = T3.c4      (B3)
     UNION ALL
     SELECT T1.c1, T2.c3, T7.c5
     FROM T1, T2, T7
        WHERE T1.c1 = T2.c2 and T2.c3 = T7.c4      (B4)
```

Branch labels B1, B2, B3, and B4 are part of a convention used herein for annotating and referring to branches. Note that branch labels are not part of SQL syntax. For example, B1 refers to the first branch in QE, B2 to the second, B3 to the third, and B4 to the fourth.

Search space analysis involves combining units that represent various alternate ways of performing transformations under join factorization. These units include a factorization transformation unit ("factorization unit") and a join factorization state ("factorization state").

A factorization unit is a set of one or more base branches and a set of tables common to those branches. It is represented herein in the format of (bs, tabs): Element bs stands for a set of base branches and element tabs stands for a set of tables common to the branches in bs. Element bs must contain at least 2 branches because a single base branch cannot be grouped into a single group branch. Element tabs must contain at least 1 table. A factorization unit represents tables to be factorized and the tables in tabs originate only from the branches in bs. In QE, for example, factorization units included:

U1: ({B1, B2, B4}, {T1, T2})—T1, T2 is factorized from B1, B2, and B4.

U2: ({B2, B4}, {T1})—T1 is factorized from B1 and B4.

U3: ({B1, B3}, {T3})—T3 is factorized from B1 and B3.

A factorization state is a set of factorization units. Example states for QE are: State 1: {U1}—perform one unit of join factorization transformation, State 2: {U2, U3}—perform two units of join factorization transformation. A factorization state represents a potential candidate query. As explained in further detail later, search space analysis involves generating valid states from zero or more factorization units and generating a query cost for a state (i.e. query cost for a query represented by the state) and comparing the costs. The following query illustrates a transformed candidate query associated with state 1 represented by {U1}.

```
QE1=  SELECT T1.c1, T2.c3, T3.c5
      FROM T1,  (SELECT T2.c3, T3.c5, T2.c2
                 FROM T2, T3
                 WHERE T2.c3 = T3.c4
                 UNION ALL
                 SELECT T2.c3, T4.c5, T2.c2
                 FROM T2, T4
                 WHERE T2.c3 = T4.c4
                 UNION ALL
                 SELECT T2.c3, T7.c5, T2.c2
                 FROM T2, T7
```

-continued
```
                 WHERE T2.c3 = T7.c4
                 ) V
      WHERE T1.c1 = V.c2 and T2.c3 = T3.c4
      UNION ALL
      SELECT T5.c1, T6.c3, T3.c5
      FROM T5, T6, T3
         WHERE T5.c1 = T6.c2 and T6.c3 = T3.c4
```

According to an embodiment, a base branch can occur in at most one unit in a state. In other words, no two units in a state can have overlapping fields of bs. For example, {U1, U3} is an invalid state because {B1, B2, B4} overlaps with {B1, B3}. B1 cannot be grouped with B2 and B4 for factorizing T1 and T2 and grouped with B3 for factorizing T3 at the same time.

Restricting Search Space States

According to an embodiment, in order to limit the number of states generated and analyzed during search space analysis, two categories of constraints are imposed. The first category is heuristic pruning. Heuristic pruning removes states that generally lead to relatively inefficient and less optimal execution plans. The second category, space state proliferation constraints, reduces the number states in the state space to simplify and expedite the search.

Heuristic Pruning

An example of a heuristic pruning constraint is one that bars a state, if it imposes a Cartesian product on the respective transformed query. A Cartesian product is a join in which there is no join condition. All rows from a table are combined with each row from the other table. The following validity check is performed for a state that factorizes T1, T2, and Tm from branches b1, b2, . . . , bn. It is determined whether joining T1, T2, . . . , $T_m$ must involve a Cartesian product. If so, the state is barred. It is determined whether factorization leads to a UNION/UNION ALL inline view in the transformed query. If it is determined that any branch of the view leads to a Cartesian product that is otherwise avoided without join factorization, then the state is barred. For example, suppose before the transformation, in a base branch, table T1 has only join conditions to the tables within {T2, T3, . . . , Tm}. If {T2, T3, . . . Tm} is factorized out, T1 is then forced to generate a Cartesian product for the tables that are not factorized out. Such a case is illustrated by the following example in which QE2 is transformed to QE3.

```
QE2=  SELECT T1.c1, T2.c3, T3.c4
      FROM T1, T2, T3
         WHERE T1.c1 = T2.c1 and T1.c2 = T3.c2
      UNION ALL
      SELECT T1.c1, T4.c3, T5.c4
      FROM T1, T4, T5
         WHERE  T1.c1 = T4.c1 and T1.c2 = T5.c2 and
                T4.c3 = T5.c4
```

Factorizing T1 in QE2 yields the following query QE3.

```
QE3=  SELECT T1.*, V.c3, V.c4
      FROM T1,
              (SELECT T2.c3, T3.c4, T2.c1, T3.c2
               FROM T2, T3
               UNION ALL
               SELECT T4.c3, T5.c4, T4.c1, T5.c2
               FROM T4, T5
```

```
      WHERE T4.c3 = T5.c4) V
WHERE T1.c1 = V.c1 and T1.c2 = V.c2
```

Inside the view V in QCP', the first branch contains a Cartesian product between T2 and T3.

Restrictions on Grouping Branches with Same Tables

Another constraint is that a factorization state must not include any group of factorization units that have the same field tabs, that is, factorize the same set of the tables. This is referred to as the one-per-table restriction. This is an example of the space state proliferation constraint. This constraint is illustrated by following query queries QGB, QGB', and QGB". These queries are represented in query language pseudo code where a query block that joins a set of tables is represented using the notation $T_n$ join $T_m$.

```
QGB=   T1 join T2       (B1)
       UNION ALL
       T1 join T3       (B2)
       UNION ALL
       T1 join T4       (B3)
       UNION ALL
       T1 join T5       (B4)
```

If no grouping restriction is imposed, a state that contains two units, ({B1, B2}, {T1}) and ({B3, B4}, {T1}), can be generated. Both units have the same table set, i.e., {T1}. This state corresponds to the transformed query QGB'.

```
QGB' =  T1 JOIN   (T2
                  UNION ALL
                  T3)
        UNION ALL
        T1 JOIN   (T4
                  UNION ALL
                  T5)
```

In QGB', there are two group branches, each group factorizes the same tables, i.e., {T1}. In more complex queries, forming different group branches that factorize the same tables can lead to an extremely large search space.

Instead, under the one-per-table-set restriction, only states that have one group branch group that factorizes table T1 are generated, such as the one represented by QGB".

```
QB" = T1 JOIN   (T2
                UNION ALL
                T3
                UNION ALL
                T4
                UNION ALL
                T5)
```

Generating Factorization Units

FIG. 2 shows a procedure for generating factorization units according to an embodiment of the present invention.

Referring to FIG. 2, at block 205, binary units are formed for a base query. A binary unit is a factorization unit that groups two base branches. For every two base branches $B_i$ and $B_j$, a set of factorization units is formed, if the following condition is satisfied. Each factorization unit is in the format of ({$B_i$, $B_j$}, tabs), where tabs contains one table T that is common to $B_i$ and $B_j$.

Next, an iteration is performed in which each iteration is associated with an integer value i, a loop counter that begins with the value 2 and is incremented by one for each iteration. The loop includes blocks 210, 215, and 220.

At block 210, check the combinations of two i-nary factorization units, denoted as (bs1, tabs1) and (bs2, tabs2). An i-nary unit is a factorization unit that has i number of base branches. If bs1=bs2 (i.e. the units have the same base branches), an i-nary factorization unit (bs1, tabs1 union tabs2) is generated with the tables that are in tabs1 or tabs2.

At block 215, check the combinations of a binary unit, denoted as (bs1, tabs1), and an i-nary unit, denoted (bs2, tabs2). If tabs1=tabs2 (i.e. the units have the same common tables) and there is exactly one common base branch between bs1 and bs2, generate an (i+1)-nary unit (bs1 union bs2, tabs1).

At block 220, it is determined whether any factorization units were generated at step 215. If factorization units were generated, then i is incremented by one and the loop begins again. Otherwise, the procedure ends.

Forming and Selecting Lowest Cost State

Figure 3A:
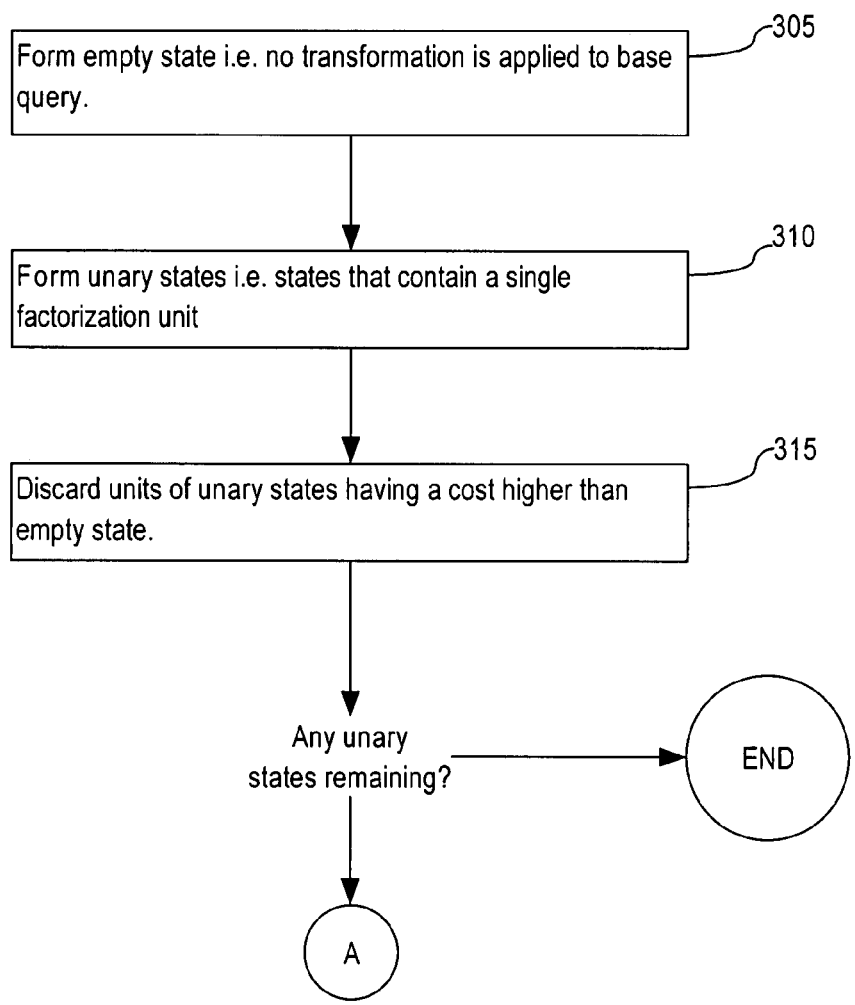
FIG. 3A is a flow chart depicting a procedure for search space analysis according to an embodiment of the present invention.
Figure 3B:
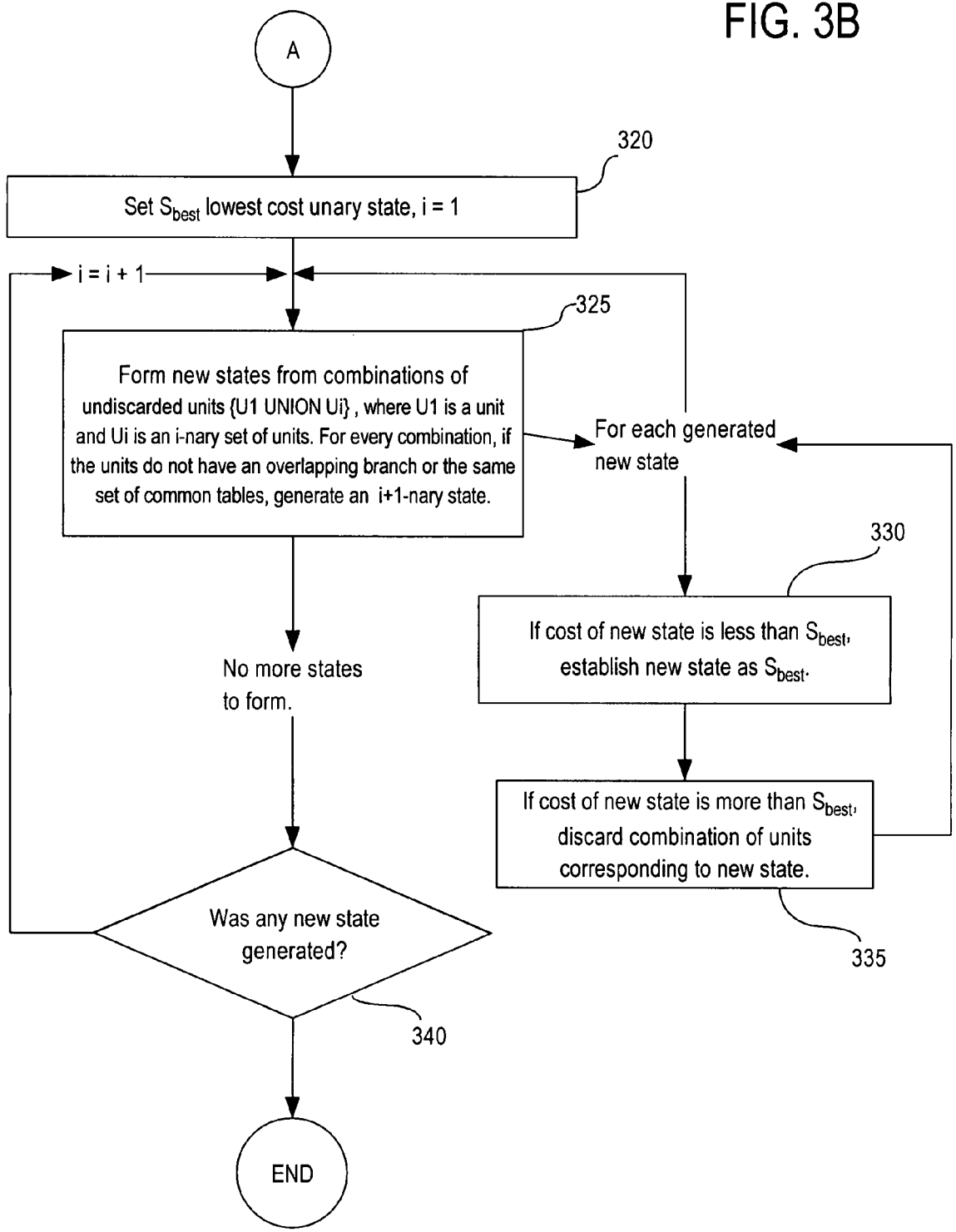
FIG. 3B is a flow chart depicting a procedure for search space analysis according to an embodiment of the present invention.

FIGS. 3A and 3B show a procedure for forming and selecting the lowest cost state representing the lowest cost transformed query. The procedure has two stages. In the first stage, depicted in FIG. 3A, the procedure forms initial states that are singleton, i.e., a set that contains only one factorization unit. In the second stage, depicted in FIG. 3B, new states are formed by combining factorization units with other factorization units. New states formed are evaluated to select a state as the least cost state.

The query cost associated with a non-unary state, {U1, U2, ..., Un}, (where U1, U2, ..., Un are factorization units comprising the state), can be directly computed from the partial costs of unary states S1, S2, ..., Sn, each comprising the units, U1, U2, ..., Un, respectively due to the additive nature of an UNION/UNION ALL query. The partial cost of a unary state, Sj: {Uj}, is the cost of the branches transformed by the unit Uj query that is transformed according to U1, ..., Un. Therefore the union of two states S1 and S2 is formed to yield a new state S3, the total cost of S3>=partial cost of S3=the partial cost of S1+partial cost of S2. Note that this is a simple computation that does not need to invoke the query cost estimator 130 for cost estimation.

If the total cost of a state, Sj: {Uj}, is already larger than a total cost of the best state so far, then the unit Uj is discarded and it is not used to form any new non-unary states, because the cost of the new state so formed must be worse than that of the best state.

Referring to FIG. 3A, at step 305, the empty state, which comprises no units, is formed. The empty state represents the base query with no transformation applied.

At step 310, unary states are formed. Unary states are states that contain a single factorization unit.

At step 315, the query cost of the unary states is determined and the units, whose corresponding states have costs that are higher than that of the empty state, are discarded, that is, the units will not be combined with others in the second stage to form new states. If no unit remains, then the empty state represents the lowest (i.e., best) cost query, which is the untransformed base query.

Otherwise, the second stage of the procedure commences.

At step 320, the unary state with the lowest cost is established as the best cost state $S_{best}$.

Next, the procedure executes within a loop. The loop is associated with loop counter i. Loop counter i is initially 1.

At step 325, form new states from combinations of undiscarded units {U1 UNION Ui}, where U1 is a unit and Ui is an i-nary set of units. For every combination, if the units do not have an overlapping branch or the same set of common tables, generate an i+1-nary state.

At block 330, if the cost of the new state is lower than $S_{best}$, then establish the new state as $S_{best}$. The old best $S_{best}$ is discarded.

At block 335, if the cost of the new state is more than $S_{best}$, then the combination of units corresponding to the new state is discarded, that is, the combination is not used to form new units in the next iteration.

If no more states can be formed at block 325, then execution flows to block 340. At block 340, it is determined whether any new states were formed in block 325. If new states were formed, i is incremented by 1 and execution returns to step 325.

If no new states were formed, the procedure returns $S_{best}$ as the result. The query associated with $S_{best}$ is deemed by the procedure as the lowest cost candidate query.

Illustration

The above procedures for search space analysis are illustrated using query QE.

In the procedure for generating factorization units (FIG. 2), the following binary units are generated.

U1: ({B1,B2},{T1})
U2: ({B1,B4},{T1})
U3: ({B2,B4},{T1})
U4: ({B1,B2},{T2})
U5: ({B1,B4},{T2})
U6: ({B2,B4},{T2})
U7: ({B1,B3},{T3})

Factorization unit U1, for example, represents that T1 and T2 are common tables to B1 and B2.

In the first iteration of the loop in FIG. 2 (see steps 210, 215, and 220), where i=2, the following binary units are generated.

U8: ({B1,B2},{T1,T2})
U9: ({B1,B4},{T1,T2})
U10: ({B2,B4},{T1,T2})

The following ternary factorization units are generated.

U11: ({B1,B2,B4},{T1,T2})
U12: ({B1,B2,B4},{T11})
U13: ({B1, B2, B4}, {T2})

In the second iteration, where i=3, every pair of a binary unit and ternary unit is checked. No new units are generated. The procedure ends.

Next, the procedure of forming and selecting the lowest cost states is performed (see FIGS. 3A and 3B).

In the first stage (FIG. 3A), the empty state and unary states are formed.

Empty State
S0: { }
Unary States
S1: {U1}
S2: {U2}
S3: {U3}
...
S13: {U13}

Next, the costs of the unary states are compared to the cost of the empty state. In the current example, only the following unary states have cost lower than S0. The undiscarded units that remain and the corresponding unary states are:

S1: {U1}={({B1, B2}, {T1})}
S6: {U6}={({B2, B4}, {T2})}
S7: {U7}={({B1, B3}, {T3})}
S9: {U9}={({B1, B4}, {T1, T2})}
S11: {U11}={({B1,B2,B4}, {T1,T2})}

In stage 2, in the first iteration (see FIG. 3B), the procedure checks the possible binary units. Among them, one combination, U6 and U7, which correspond to S6 and S7, is valid i.e. U6 and U7 do not have an overlapping branch or the same set of common tables, and may be used to form a new state S14. S14 has a lower cost than any of the unary states. Therefore, the following state S14 remains. S14: {({B2, B4}, {T2}), ({B1, B3}, {T3})}

In the next iteration: all possible pairs of undiscarded unary units and undiscarded binary units are checked. No new state can be generated. The procedure terminates and S14 is returned as the least cost state. S14 is represented by the following transformed query QS14.

```
QS14=SELECT V1.c1, V1.c3, T3.c5
    FROM T3, (SELECT T1.c1, T2.c3
        FROM T1, T2
        WHERE T1.c1 = T2.c2
        UNION ALL                         ({B1, B3}, {T3})
        SELECT T5.c1, T6.c3
        FROM T5, T6
        WHERE T5.c1 = T6.c2) V1
    WHERE T3.c4 = V1.c3
    UNION ALL
    SELECT T1.c1, T2.c3, V2.c5
    FROM T1, T2, (SELECT c4, c5            ({B2, B4}, {T2})
        FROM T4
        UNION ALL
        SELECT c4, c5
        FROM T7) V2
    WHERE T1.c1 = T2.c2 and T2.c3 = V2.c4;
```

Reusing Estimated Costs for Query Blocks

If a query block (e.g. base branch, group branch) remains unchanged between states A and B, and the cost of the query block has already been estimated for state A, the cost may be reused to estimate the cost of state B. The costs of a query block may be reused in several ways.

For example, in a UNION ALL query which contains n base branches, m (m<=n) branches undergo join factorization. Before the factorization, a cost is generated for each base branch. After the factorization, only the costs for the group branches in which m branches are grouped are generated. For the (n-m) branches that were not grouped, the costs are reused.

Also, a branch that undergoes join factorization may have subqueries. If a subquery does not involve any factorized table that is going to be factorized, the subquery remains intact during transformation. The cost of the subquery may be reused as well.

Hardware Overview

Figure 4:
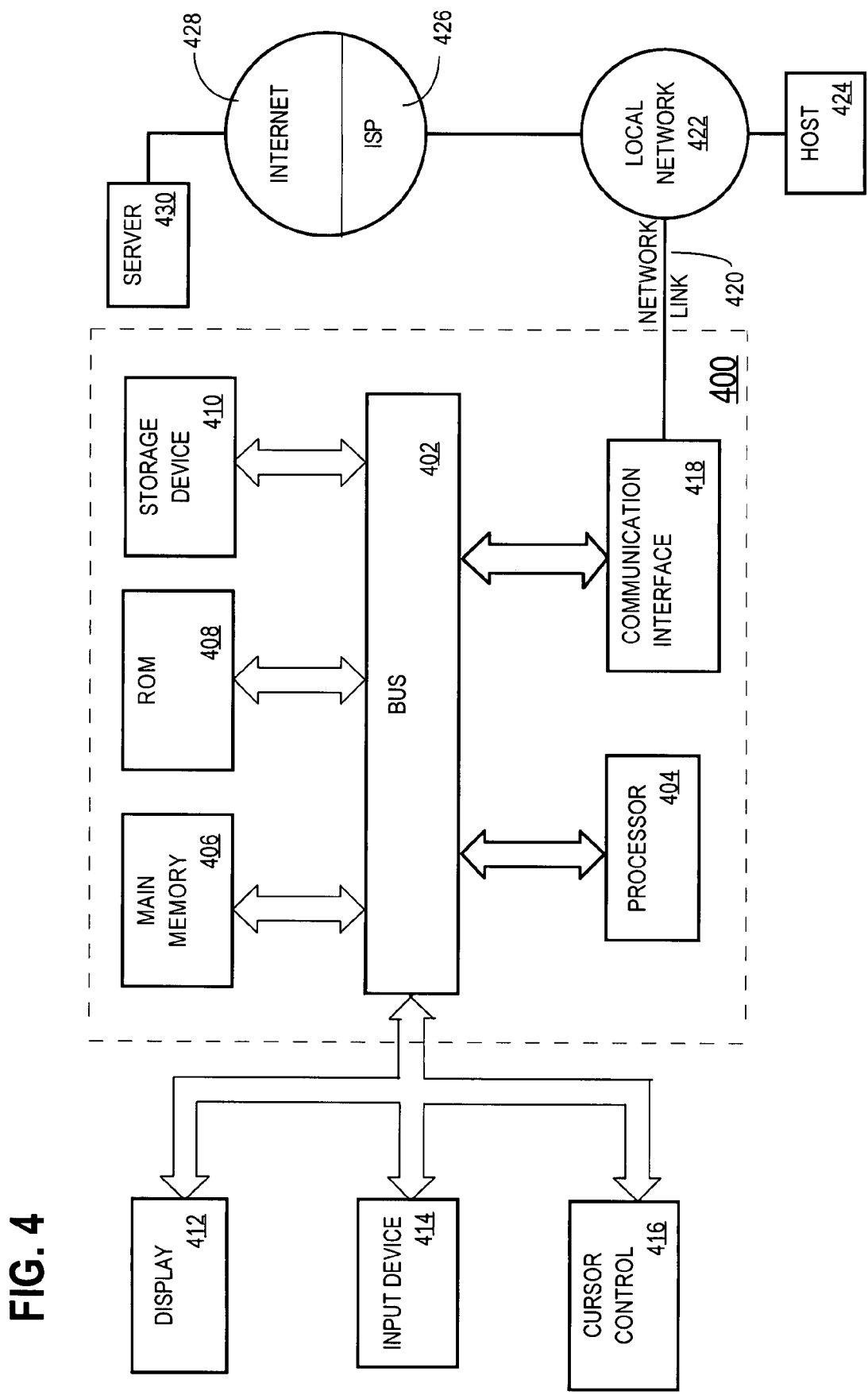
FIG. 4 is a diagram of computer system that may be used in an implementation of an embodiment of the present invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer implemented method, comprising:
transforming a base query to generate a transformed query;
wherein the base query includes a union between each base branch of a plurality of base branches;
wherein each of two or more base branches of said plurality of base branches joins a set of tables;
wherein the sets of tables of the two or more base branches of the plurality of base branches include a common table set shared by all the sets of tables, said common table set including a common table;
wherein each of the two or more base branches of the plurality of base branches include a respective set of tables that does not include said common table set;
wherein the step of transforming the base query includes replacing the plurality of base branches with a first group branch that joins the common table and an inline view, the inline view comprising a union between a plurality of respective branches, wherein the plurality of respective branches includes, for each base branch of said plurality of base branches, a FROM list that:
references the respective set of tables, and
does not reference the common table; and
wherein the method is performed by one or more computing devices.

2. The method of claim 1,
wherein each base branch of said plurality of base branches includes a respective join condition based on a particular column of said common table and a particular join condition operator;
wherein the first group branch includes a join condition based on the join condition operator, a column of the inline view, and the column of the common table; and
wherein each branch of said plurality of respective branches excludes the respective join condition.

3. The method of claim 1,
wherein each base branch of said plurality of base branches includes a respective join condition based on a particular column of said common table and a particular join condition operator; and
wherein each respective branch of said plurality of respective branches includes said respective join condition.

4. The method of claim 1, wherein the common table set includes at least one other common table.

5. The method of claim 4, wherein the first group branch joins the common table, inline view, and the at least one other common table.

6. The method of claim 1, wherein:
the base query includes a union between a set of base branches that include said plurality of base branches and at least another branch; and
said transformed query includes said another branch.

7. The method of claim 1, wherein:
the base query includes a union between a set of base branches that include said plurality of base branches and a second plurality of base branches;
each base branch of said second plurality of base branches joins a set of tables;
the sets of tables of the second plurality of base branches include a second common table; and
the step of transforming the base query includes replacing the second plurality of base branches with a second group branch that joins the second common table and second inline view.

8. The method of claim 7, wherein at least one branch of the plurality of base branches joins the second common table.

9. The method of claim 1, wherein the plurality of base branches are contained with a query block within the base query.

10. The method of claim 1, wherein the base query contains a second plurality of branches within the union and the transformed query contains the same second plurality of branches.

11. A computer-readable storage medium storing one or more sequences of instructions which, when executed by one or more processors, cause to perform:
transforming a base query to generate a transformed query;
wherein the base query includes a union between each base branch of a plurality of base branches;
wherein each of two or more base branches of said plurality of base branches joins a set of tables;
wherein the sets of tables of the two or more base branches of the plurality of base branches include a common table set shared by all the sets of tables, said common table set including a common table;
wherein each of the two or more base branches of the plurality of base branches include a respective set of tables that does not include said common table set;
wherein the step of transforming the base query includes replacing the plurality of base branches with a first group branch that joins the common table and an inline view, the inline view comprising a union between a plurality of respective branches, wherein the plurality of respective branches includes, for each base branch of said plurality of base branches, a FROM list that:
references the respective set of tables, and
does not reference the common table.

12. The computer-readable storage medium of claim 11, wherein:
each base branch of said plurality of base branches includes a respective join condition based on a particular column of said common table and a particular join condition operator;
the first group branch includes a join condition based on the join condition operator, a column of the inline view, and the column of the common table; and
each branch of said plurality of respective branches excludes the respective join condition.

13. The computer-readable storage medium of claim 11, wherein:
each base branch of said plurality of base branches includes a respective join condition based on a particular column of said common table and a particular join condition operator; and
each respective branch of said plurality of respective branches includes said respective join condition.

14. The computer-readable storage medium of claim 11, wherein the common table set includes at least one other common table.

15. The computer-readable storage medium of claim 14, wherein the first group branch joins the common table, inline view, and the at least one other common table.

16. The computer-readable storage medium of claim 11, wherein:
the base query includes a union between a set of base branches that include said plurality of base branches and at least another branch; and said transformed query includes said another branch.

17. The computer-readable storage medium of claim 11, wherein:
- the base query includes a union between a set of base branches that include said plurality of base branches and a second plurality of base branches;
- each base branch of said second plurality of base branches joins a set of tables;
- the sets of tables of the second plurality of base branches includes a second common table; and
- the step of transforming the base query includes replacing the second plurality of base branches with a second group branch that joins the second common table and second inline view.

18. The computer-readable storage medium of claim 17, wherein at least one branch of the plurality of base branches joins the second common table.

19. The computer-readable storage medium of claim 11, wherein the plurality of base branches are contained with a query block within the base query.

20. The computer-readable storage medium of claim 11, wherein the base query contains a second plurality of branches within the union and the transformed query contains the same second plurality of branches.

\* \* \* \* \*

UNITED STATES PATENT AND TRADEMARK OFFICE
CERTIFICATE OF CORRECTION

PATENT NO. : 7,644,062 B2
APPLICATION NO. : 11/716010
DATED : January 5, 2010
INVENTOR(S) : Hong Su et al.

It is certified that error appears in the above-identified patent and that said Letters Patent is hereby corrected as shown below:

On the Title Page, Item (56) on page 3, under "Other Publications", line 3, delete "Algorithem" and insert -- Algorithm --, therefor.

Signed and Sealed this

Fourteenth Day of September, 2010

David J. Kappos
*Director of the United States Patent and Trademark Office*